United States Patent
Wang et al.

(10) Patent No.: US 10,170,076 B2
(45) Date of Patent: Jan. 1, 2019

(54) METHOD FOR SENDING COMMANDS TO DISPLAY DEVICES CONNECTED IN SERIES

(71) Applicant: DynaScan Technology Corp., Taoyuan County (TW)

(72) Inventors: Tsun-I Wang, Taoyuan County (TW); Ching-Chun Wu, Taoyuan County (TW); Chia-Liang Yang, Taoyuan County (TW)

(73) Assignee: DynaScan Technology Corp., Taoyuan (TW)

( * ) Notice: Subject to any disclaimer, the term of this patent is extended or adjusted under 35 U.S.C. 154(b) by 253 days.

(21) Appl. No.: 15/359,109

(22) Filed: Nov. 22, 2016

(65) Prior Publication Data

US 2017/0148129 A1    May 25, 2017

(30) Foreign Application Priority Data

Nov. 25, 2015    (TW) .............................. 104139269 A

(51) Int. Cl.
    *G09G 5/00*    (2006.01)
    *G06F 3/14*    (2006.01)
    *G06T 1/20*    (2006.01)

(52) U.S. Cl.
    CPC ........... *G09G 5/006* (2013.01); *G06F 3/1446* (2013.01); *G06T 1/20* (2013.01)

(58) Field of Classification Search
    CPC .......... G06F 3/1446; G06T 1/20; G09G 5/006
    See application file for complete search history.

(56) References Cited

U.S. PATENT DOCUMENTS

| | | | | |
|---|---|---|---|---|
| 6,097,351 | A * | 8/2000 | Nishida | G09F 9/307 345/1.3 |
| 2002/0163513 | A1* | 11/2002 | Tsuji | G06F 3/1446 345/204 |
| 2004/0046707 | A1* | 3/2004 | Mori | G06F 3/1431 345/1.1 |
| 2015/0228220 | A1* | 8/2015 | Li | G09G 3/2085 345/83 |

\* cited by examiner

*Primary Examiner* — Oussama Roudani
(74) *Attorney, Agent, or Firm* — Hanley, Flight & Zimmerman, LLC

(57) ABSTRACT

A method for sending commands to display devices connected in series includes sending a command to the first display device of N display devices connected in series. The command has a header and each of the N display devices has a same preset identification code. The first display device of N display devices receives the command and determines whether the header is corresponding to the preset identification code. When the header of the command is corresponding to the preset identification code, the first display device executes the command. When header of the command is different from the preset identification code, the first display device generates a modified command by adding an adjustment to the header of the command and sends the modified command to the next display device.

10 Claims, 4 Drawing Sheets

METHOD FOR SENDING COMMANDS TO DISPLAY DEVICES CONNECTED IN SERIES

CROSS-REFERENCE TO RELATED APPLICATIONS

This non-provisional application claims priority under 35 U.S.C. § 119(a) on Patent Application No(s). 104139269 filed in Taiwan, R.O.C. on Nov. 25, 2015, the entire contents of which are hereby incorporated by reference.

BACKGROUND

Technical Field

This disclosure relates to a method for sending commands to display devices connected in series, and more particularly to a method for sending commands to display devices connected in series without presetting the identification code of the display devices.

Related Art

Nowadays, many enterprises, government organizations, hospitals, transportations, or media usually display videos via large display devices in order to attract more attention to the videos of corporate image, advertisements, medical introductions, hot news, or other advertising videos. The large form display devices are generally composed of multiple display devices and controlled via the remote controllers.

The conventional method of controlling the display devices connected in series includes presetting multiple display devices as different identification codes, and then sending the commands to a selected display device based on the identification code. There are two methods of presetting the identification code: one is sending a setting command to each display device respectively according to a list and the other is sending a command of setting identification code, which is transmitted among the first display device and the last display device, from a control terminal. All the display devices set the identification code based on the command of setting identification code. Presetting the identification code by these two methods is not only time-consuming and hard to operate but also probable to make an error in setting and cause difficult of follow-up maintenance and modification.

SUMMARY

The method for sending commands to display devices connected in series in the disclosure includes sending a command to the first display device of N display devices connected in series wherein N is a positive integer. The command includes a header and each of the N display devices includes an identification code. The identification code of each of the N display devices is predetermined as a preset identification code. After receiving the command, the first display device determines whether the header is matched to the preset identification code. When the header is matched to the preset identification code, the first display device executes the command. On the other hand, when the header is not matched to the preset identification code, the first display device adds an adjustment to the header to generate a modified command, and sends the modified command to the next display device connected in series.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
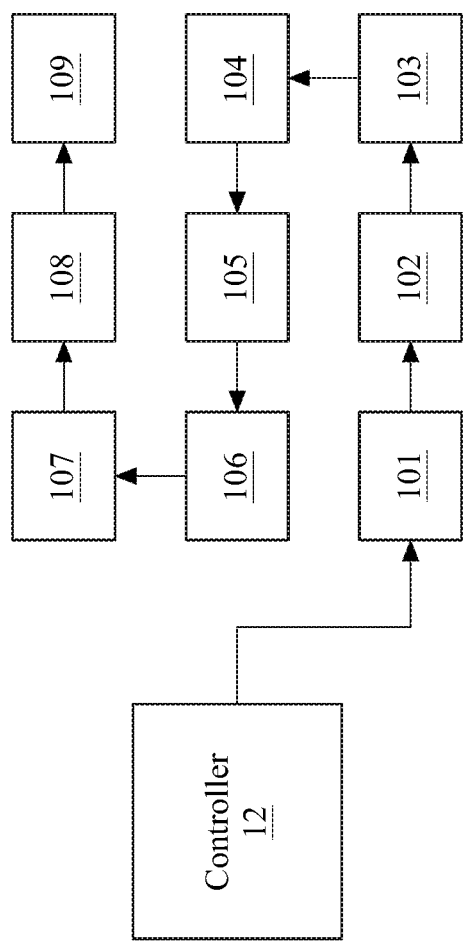
FIG. 1 is a schematic diagram of a plurality of display devices and the controller in an embodiment.
Figure 2:
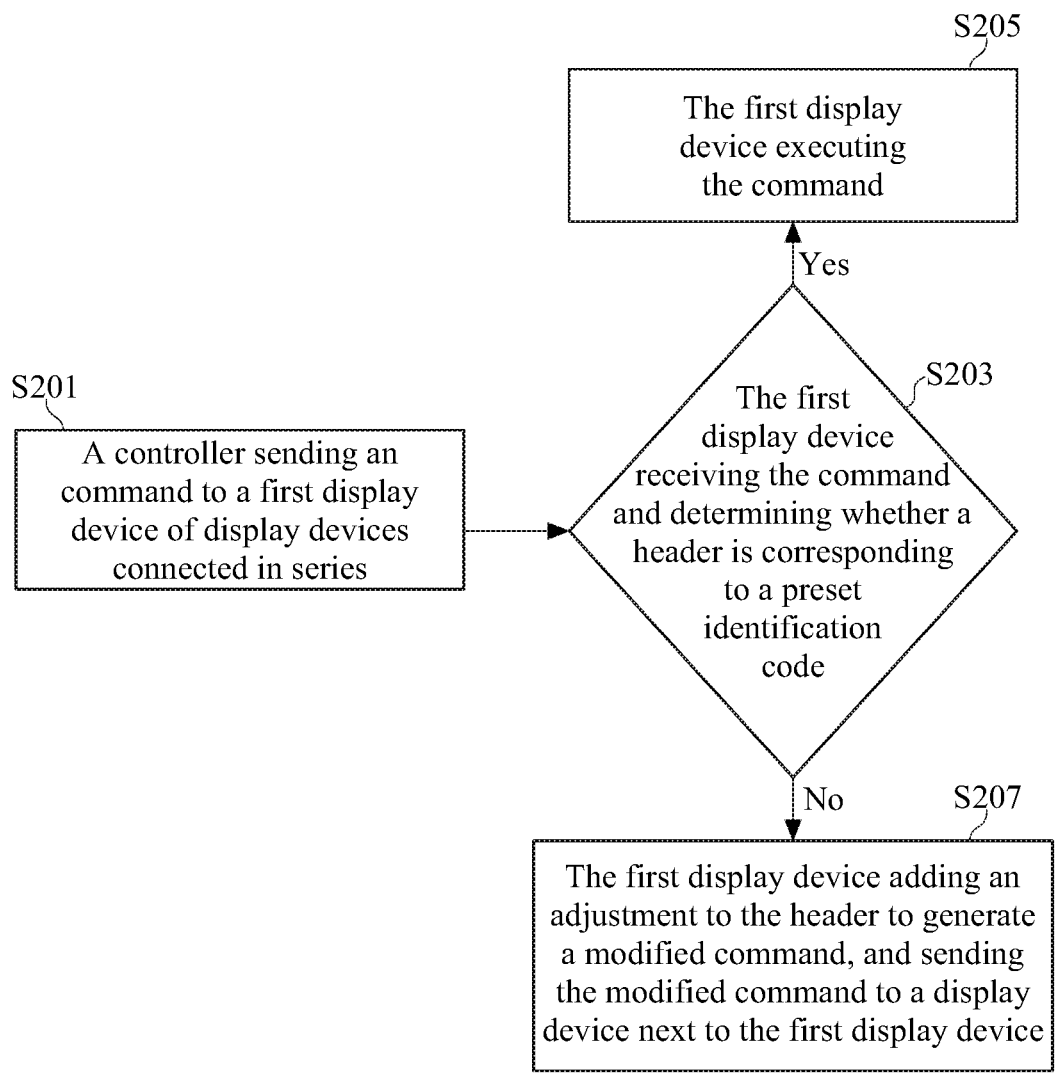
FIG. 2 is a flow chart of a method for sending commands to display devices connected in series in an embodiment.

Please refer to FIG. 1 and FIG. 2, wherein FIG. 1 is a schematic diagram of a plurality of display devices and a controller in an embodiment, and FIG. 2 is a flow chart of a method for sending commands to display devices connected in series in an embodiment. As shown in FIG. 1 and FIG. 2, the method for sending commands to display devices connected in series is applied to a controller 12. The controller 12 is used for sending a command to a plurality of display devices 101-109 connected in series. The controller 12 is a computer, an input switch, or other applicable electronic device, which is not limited in the disclosure.

In step S201, the controller 12 sends a command to the first display device 101 of the display devices 101~109. The command includes a header and each of the display devices 101~109 has an identification code. Generally, the identification code of each of the display devices 101~109 is predetermined as the same identification code as the display devices 101~109 being manufactured. In step S203, after receiving the command, the first display device 101 determines whether the header is matched to the identification code. In step S205, when the header is matched to the preset identification code, the first display device 101 executes the command. In step S207, when the header is not matched to the preset identification code, the first display device 101 adds an adjustment to the header to generate a modified command, and sends the modified command to the next display device 102 connected in series.

In an embodiment, the display devices 101~109 are sequenced in the order of the display device 101, the display device 102 to the display device 109, and the preset identification code of the display devices 101-109 are predetermined to 01. The controller 12 generates the header of the command based on the order of the display devices 101~109, the present identification code 01 of the display devices 101~109 and an adjustment which is predetermined to −1. When the controller 12 outputs the command to ask the display device 103 to be turned off, the controller 12 defines the header of the command as 03 based on the third order of the display device 103, the preset identification code 01 and the adjustment −1, and outputs both the shutdown command and the header to the display device 101.

The display device 101 firstly receives the command from the controller 12 and determines whether the header 03 of the command is matched to the preset identification code 01. When the display device 101 determines the header 03 of the command is not matched to the preset identification code 01, the display device 101 adds the adjustment −1 to the header 03 of the command, and then the header becomes 02. Next, the display device 101 outputs the modified command that the header is modified as 02 to the next display device 102. In other words, the display device 102 secondly receives the command outputted by the controller 12 after the display device 101.

Afterwards, when the display device 102 receives the modified command from the display device 101, the display device 102 determines whether the header 02 of the modified command is matched to the preset identification code 01. When the display device 102 determines the header 02 is not matched to the preset identification code 01, the display device 102 modifies the header as 01 and outputs the modified command that the header is modified as 01 to the display device 103. When the display device 103, following the display device 102, receives the modified command outputted by the display device 102, the display device 103 determines whether the header 01 of the modified command is matched to the preset identification code 01. When the display device 103 determines the header 01 is matched to the preset identification code 01, the display device 103 executes shutdown based on the command.

In an embodiment, the display devices 101~109 have the same preset identification code. The preset identification code, a default setting when each of the display device 101-109 is manufactured, or other fitting identification code, is not limited in the disclosure. In the embodiment, by the step of defining the header of the command and the display device modifying the header of the command, the controller 12 can correctly send the command to a selected display device without any presetting of the identification code of the display device. Also, the controller 12 controls the display devices 101-109 to turn off, turn on, switch inputs, or other commands which are not limited in the disclosure.

Figure 3:
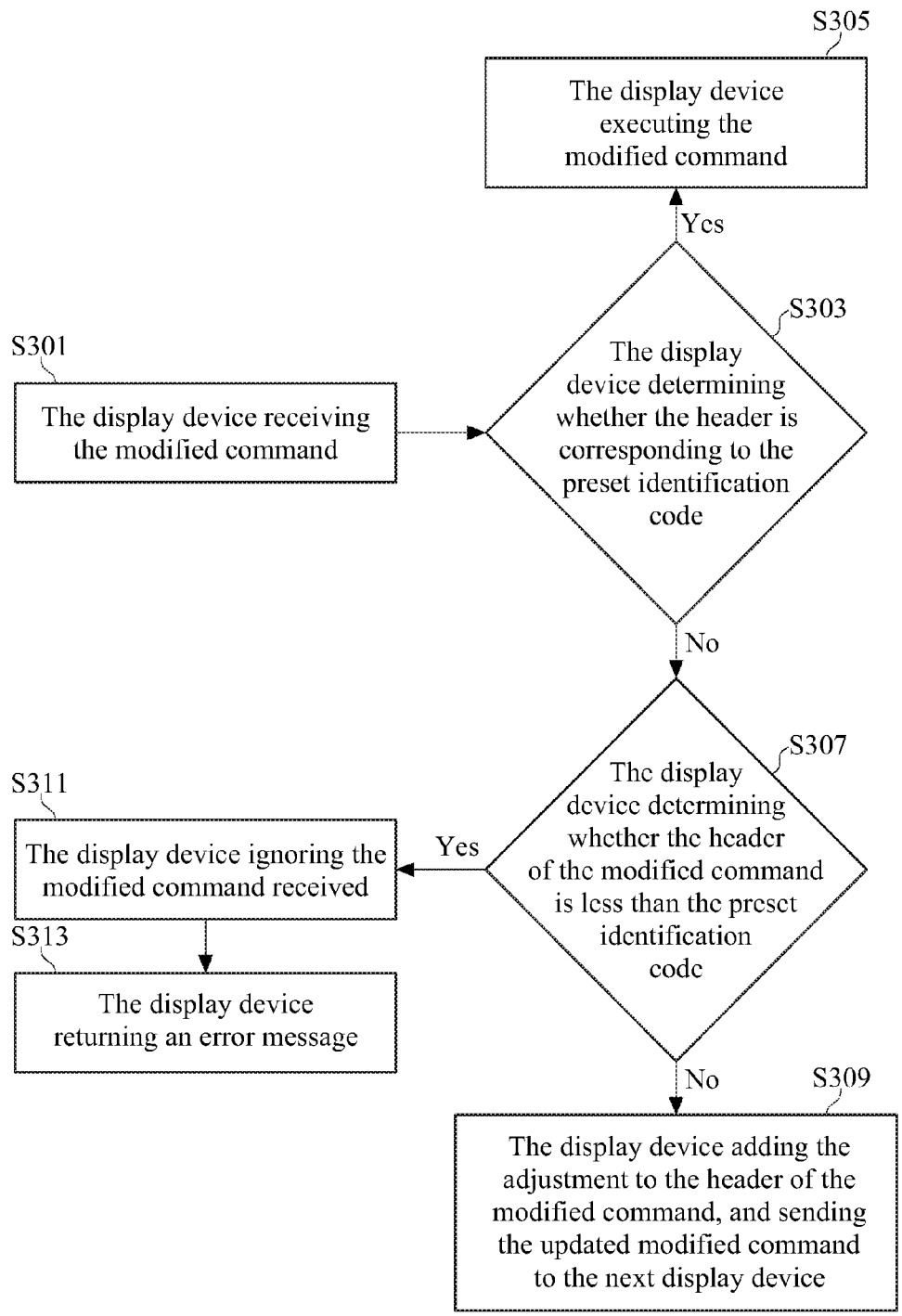
FIG. 3 is a flow chart of a method for sending commands to display devices connected in series in another embodiment.

Please refer to FIG. 1 and FIG. 3, FIG. 3 is a flow chart of the method for sending command to display devices connected in series in another embodiment. In this embodiment, the method further includes a step of determining whether the command is incorrect. As shown in FIG. 3, in step S301, the P-th display device of the display devices receives the modified command from the previous display device. In step S303, the P-th display device determines whether the header of the modified command is matched to the preset identification code. In step S305, when the P-th display device determines the header of the modified command is matched to the preset identification code, the P-th display device executes the command. In step S307, when the header of the modified command is not matched to the preset identification code, the P-th display device determines whether the header is incorrect. With a negative adjustment, if the header is less than the identification code, the header is incorrect. On the other hand, with a positive adjustment, if the header is larger than the identification code, the header is incorrect. In step S309, when the header of the modified command is larger than the preset identification code, the P-th display device adds the adjustment to the header of the modified command, and outputs the updated modified command to the next display device. In step S311, when the header of the modified command is less than the preset identification code, the P-th display device ignores the command received. Then, in step S313, the P-th display device returns an error message to the controller 12. The error message indicates that the P-th display device receives an incorrect command.

To explain more clearly, the following explanation of an embodiment starts from the first display device 101 receiving the command. In this embodiment, the controller 12 generates the header of the command base on the order of the display devices 101~109, the identification code 01 of the display devices 101~109 and an adjustment which is predetermined to −2. When the controller 12 outputs the command to shut down the display device 103, the controller 12 defines the header of the command as 05 based on the third order of the display device 103, the preset identification code 01 and the adjustment −2, and outputs both the shutdown command and the header to the display device 101.

Then, the display device 101 determines whether the header 05 of the command is matched to the preset identification code 01. When the display device 101 determines the header 05 of the command is not matched to the preset identification code 01, the display device 101 modifies the header of the command as 03 based on the adjustment −2 and outputs the modified command that the header is modified as 03 to the next display device 102. Next, the display device 102 determines whether the header 03 of the modified command is matched to the preset identification code 01. When the display device 102 determines the header 03 is still not matched to the preset identification code 01, the display device 102 further determines whether the header 03 is less than the preset identification code 01. When the display device 102 determines the header 03 of the modified command is larger than the preset identification code 01, the display device 102 modifies the header as 01 based on the adjustment −2, and outputs the modified command that the header is modified as 01 to the display device 103. Similarly, the display device 103 determines whether the header 01 of the modified command is matched to the preset identification code 01. When the display device 103 determines the header 01 is matched to the preset identification code 01, the display device 103 is shut down based on the modified command.

In another embodiment, when the controller 12 outputs a command with a header 04 to the display device 101, the display device 101 determines whether the header 04 of the command is matched to the preset identification code 01. When the display device 101 determines the header 04 of the command is not matched to the preset identification code 01, the display device 101 modifies the header of the command as 02 based on the adjustment −2, and outputs the modified command that the header is modified as 02 to the next display device 102. Next, the display device 102 determines whether the header 02 of the modified command received is matched to the preset identification code 01. When the display device 102 determines the header 02 is not matched to the preset identification code 01, the display device 102 further determines whether the header 02 is incorrect. When the display device 102 determines the header 02 of the modified command is larger than the preset identification code 01, the display device 102 modifies the header as 00 based on the adjustment −2, and outputs the modified command that the header is modified as 01 to the display device 103.

Afterwards, the display device 103 similarly determines whether the header 00 of the modified command is matched to the preset identification code 01. When the display device 103 determines the header 00 is not matched to the preset identification code 01, the display device 103 further determines whether the header 00 is incorrect. With a negative adjustment, if a header is less than a preset identification code, the header is incorrect. Therefore, when the display device 103 determines the header 00 is less than the preset identification code 01, the display device 103 ignores the modified command that the header is modified as 00, and returns an error message to the controller 12 to let the controller 12 decide to resend the command or not to do. In this embodiment, the command that the header is 04 from the controller 12 can be an incorrect command or other data used by the controller 12 for indicating other message. This disclosure does not intend to limit the command.

In the embodiment described above, the adjustment is a negative value. In another embodiment, the adjustment can also be a positive value, not limited by the embodiment. Moreover, when the display device modifies the header by adding a positive adjustment to the header and the display device determines the header of the command is not matched to a preset identification code, the display device continuously determines whether the header of the command is larger than the preset identification code. The related details are not described again.

Figure 4:
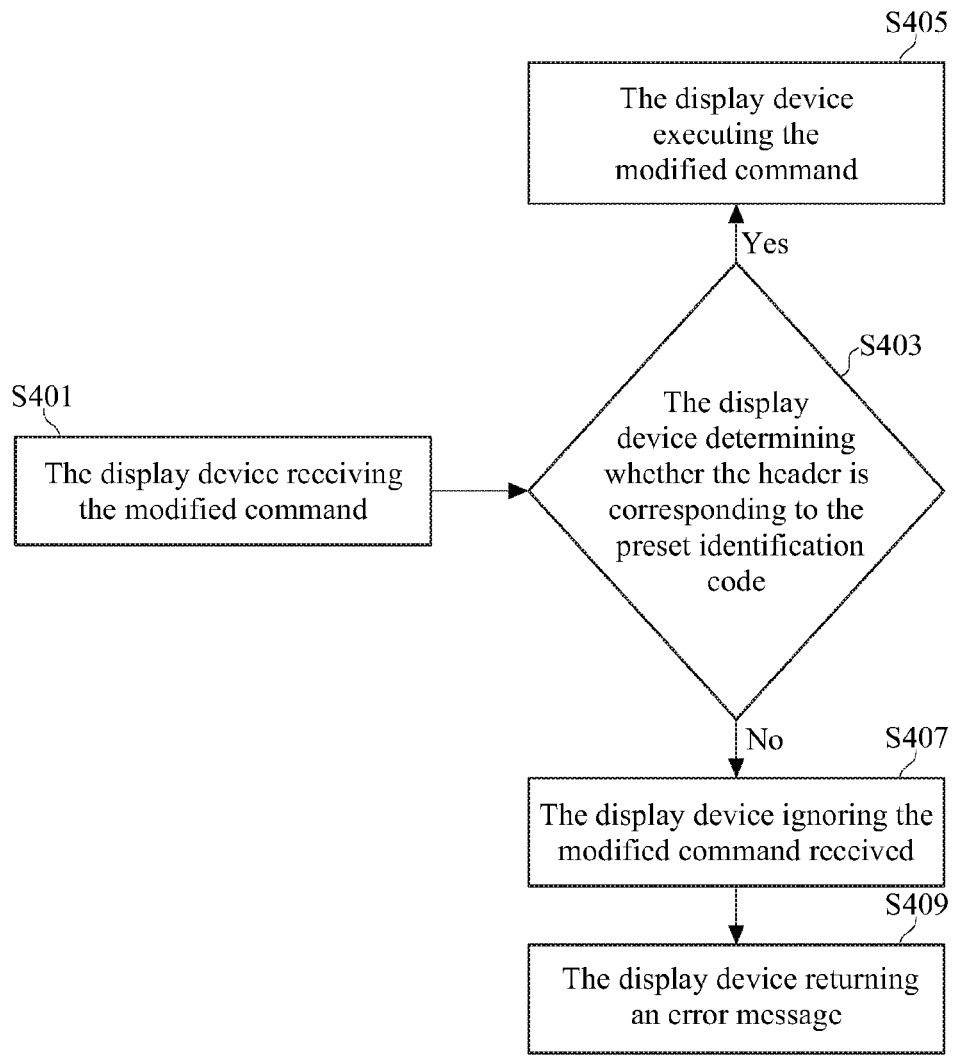
FIG. 4 is a flow chart of a method for sending commands to display devices connected in series in yet another embodiment.

In practice, the display device 109, the last one in the order, can have a different method of determination from other display devices. Please refer to FIG. 1 and FIG. 4, FIG. 4 is a flow chart of the method for sending commands to display devices connected in series in yet another embodiment. As shown in FIG. 4, steps S401 to S405 are similar to steps S301 to S305 in the previous embodiment. In comparison with the previous embodiment, the difference is that, in step S407, when the display device 109 determines the header of the modified command outputted by the display device 108 is not matched to the preset identification code, the display device 109 ignores the command and returns an error message to the controller 12 in step S409. The error message indicates that the display device 109 receives the incorrect command.

As a practical example, when the command from the controller 12 is sent to the last display device 109, the header of the command is 03. When the display device 109 determines the header 03 of the command is still not matched to the preset identification code 01, the display device 109 ignores the command that the header is 03 and returns an error message to the controller 12. In this embodiment, the incorrect command determined by the display device 109 may be not a false command, but a signal used for executing other missions from the controller 12. Therefore, step S407 can be cancelled in other embodiments. Similarly, step S307 shown in FIG. 3 can also be cancelled.

In the embodiment described above, the header is shown in decimal system for explaining more simply. The disclosure does not intend to limit the system of the header. In another embodiment, the header can be shown in binary system, hexadecimal system, or other suitable system. The related details are not described.

In view of the above description, the disclosure provides a method for sending commands to display devices connected in series. In the disclosure, because the identification code of display devices are generally predetermined as the same preset identification code as manufactured, by defining the header of a command and modifying the header of the command by display devices, the command can be correctly sent to a selected display device without defining the identification code of each display devices connected in series. Then the selected display device executes mission based on the command, such as turning on, turning off, or switching source of input signal.

What is claimed is:

1. A method for sending commands to display devices connected in series, comprising:
   sending a command to a first display device of N display devices connected in series, the command having a header, each of the N display devices having an identification code, and the identification codes of the N display devices are predetermined as a same preset identification code;
   the first display device receiving the command and determining whether the header is corresponding to the preset identification code;
   when the header is corresponding to the preset identification code, the first display device executing the command; and
   when the header of the command is different from the preset identification code, the first display device adding an adjustment to the header to generate a modified command, and sending the modified command to a display device next to the first display device;
   wherein N is a positive integer.

2. The method of claim 1, further comprising:
   a P-th display device of the N display devices receiving the modified command and determining whether a header of the modified command is corresponding to the preset identification code;
   when the header of the modified command is corresponding to the preset identification code, the P-th display device executing the command; and
   when the header of the modified command is different from the preset identification code, the P-th display device adding the adjustment to the header of the modified command, and sending the updated modified command to a display device next to the P-th display device;
   wherein P is a positive integer less than N.

3. The method of claim 2, wherein the adjustment is a negative value, and when the P-th display device determines that the header of the modified command is different from the preset identification code, the method further comprises:
   determining whether the header of the modified command is less than the preset identification code; and
   when the header is less than the preset identification code, the P-th display device ignoring the modified command received.

4. The method of claim 3, wherein when the P-th display device determines the header of the modified command is less than the preset identification code, the method further comprises returning an error message indicating that the modified command received by the P-th display device is incorrect.

5. The method of claim 2, wherein the adjustment is a positive value, when the P-th display device determines the header of the modified command is different from the preset identification code, the method further comprises:
   determining whether the header of the modified command is larger than the preset identification code; and
   when the header is larger than the preset identification code, the P-th display device ignoring the modified command received.

6. The method of claim 5, wherein when the P-th display device determines the header of the modified command is larger than the preset identification code, the method further comprises returning an error message indicating that the modified command received by the P-th display device is incorrect.

7. The method of claim 1, further comprising:
- an N-th display device of the N display devices receiving the command and determining whether a header of the modified command is corresponding to the preset identification code;
- when the header of the modified command is corresponding to the preset identification code, the N-th display device executing the command; and
- when the header of the modified command is different from the preset identification code, the N-th display device ignoring the modified command received.

8. The method of claim 7, wherein when the N-th display device determines the header of the modified command is different from the preset identification code, the method further comprises returning an error message indicating that the modified command received by the N-th display device is incorrect.

9. The method of claim 1, wherein the N display devices have an order, and the method further comprises generating the header of the command based on the order, the preset identification code, and the adjustment.

10. The method of claim 1, wherein the command indicates one of the N display devices to turn on/off or to switch input signal.

* * * * *